US005854733A

United States Patent [19]

Jerkins

[11] Patent Number: 5,854,733

[45] Date of Patent: Dec. 29, 1998

[54] STATIC CHARGE ELIMINATING LINGERIE ORGANIZER

[76] Inventor: Gloria B. Jerkins, P.O. Box 684, Stapleton, Ala. 36578

[21] Appl. No.: 989,100

[22] Filed: Dec. 11, 1997

[51] Int. Cl.$^6$ ..... H01M 1/00

[52] U.S. Cl. ..... 361/212; 361/215; 361/220; 206/720

[58] Field of Search ..... 361/212, 215, 361/220; 206/286, 287, 287.1, 709, 720

[56] References Cited

U.S. PATENT DOCUMENTS 4,238,030 12/1980 Maylandt ..... 206/313
4,308,953 1/1982 Cohen ..... 206/334
5,107,989 4/1992 Becker ..... 206/328
5,715,937 2/1998 Oshry et al. ..... 206/308.1

*Primary Examiner*—Jeffrey Gaffin
*Assistant Examiner*—Kim Huynh
*Attorney, Agent, or Firm*—Joseph N. Breaux

[57] ABSTRACT

A static charge eliminating lingerie organizer comprising a plurality of individual lingerie storage pouches wherein each lingerie storage pouch is dimensioned to store therein at least one lingerie garment and wherein each lingerie storage pouch attracts static charge of the at least one lingerie garment stored therein. A grounding pouch dimensioned to received the plurality of individual lingerie storage pouches and neutralize the static charge.

19 Claims, 3 Drawing Sheets

STATIC CHARGE ELIMINATING LINGERIE ORGANIZER

TECHNICAL FIELD

The present invention relates to storage pouches and, more particularly, a static charge eliminating lingerie organizer comprising a plurality of individual lingerie storage pouches made of electrically conductive film for attracting static charge from the fabric of lingerie garments stored therein and a grounding pouch which serves to eliminate the static charge conducting along the conductive film of the plurality of individual lingerie storage pouches stored therein. Each of the plurality of individual lingerie storage pouches is separate and detached from the other, wherein each lingerie storage pouch is dimensioned to accommodate therein at least one lingerie garment for organizing garments into types of garments and/or lingerie sets. The grounding pouch is dimensioned to receive therein the plurality of individual lingerie storage pouches for binding the plurality of individual lingerie storage pouches together into a single unitary package.

BACKGROUND OF THE INVENTION

Women often buy panty and bra sets hereinafter sometimes referred to as "lingerie sets." These lingerie sets are placed within a drawer of a dresser or the like until such lingerie sets are to be worn. Moreover, such lingerie sets may also include a sleek nightgown to be worn in combination with the bra and panty lingerie set. Furthermore, the lingerie sets may include a bra and a shorts-like lingerie garment. The problem with lingerie sets is that the garment components of the lingerie sets become separated from the other and the matching components of the lingerie set must be hunted for in a pile of lingerie garments.

For example, when storing lingerie in the drawers of a dresser or the like, one drawer may be designated to underwear, another drawer to panties and even another drawer to nightgowns. Therefore, when matching the desired ensemble, a women typically must hunt for the components of the ensemble. Furthermore, it is not uncommon to find a drawer if filled with numerous lingerie garments such as teddies, lots of panties and unmatched bras, stockings, socks, etc.

Another problem with lingerie storage in dresser drawers is the lack of organization in the drawers. More to the point, because the lingerie garments are relatively small in size, the drawers are capable of storing a large number of lingerie garments which often become muddled within the drawer, especially, when rooting for a particular garment desired to be worn.

Finally, lingerie garments are made of a fabric which typically attracts and collects static charge, especially, after drying such lingerie garments in a conventional clothes dryer. Moreover, static charge collects on the fabric of lingerie garments in the winter months because of the charge present in the air when heating the home. Henceforth, when a woman wants to put a nightgown on made of such static charged fabric, the nightgown clings to her body which is often undesirable. Furthermore, the static charged lingerie garments such as, without limitation, teddies, panties, slips, camisoles, bras, and stocking, can cause unpleasant shocks between the woman wearing the lingerie garment and another person.

Several devices have been patented which are aimed at carry bags and article holders.

U.S. Pat. No. 5,588,749, by Ishikawa, entitled "MULTI-FUNCTIONAL BAG" discloses a multifunctional bag which can be used to carry articles therein and also serves as a pair of seats, a cushion, a lap robe, a sleeping bag, and a hooded poncho.

U.S. Pat. No. 5,439,154, by Delligatti, entitled "DIAPER BAG" discloses a diaper bag having a plurality of compartments sewn to the walls of the diaper bag wherein the compartments have a hollow interior for storing therein an article.

U.S. Pat. No. 5,244,278, by Robitaille, entitled "COMBINATION TRAVEL POUCH AND ALL PURPOSE CLOTH accessory" discloses a travel pouch which can be used as a bib or lap napkin. Furthermore, the travel pouch can receive therein articles such as a wet diaper, swim suit as well as toilet articles and other small accessories. The flexible properties of the travel pouch allow the travel pouch to be easily rolled up.

U.S. Pat. No. 5,002,401, by Blackman, entitled "ARTICLE HOLDER AND CARRIER" discloses a box-like container having fabric walls which are adapted to disconnect along an edge between two walls. The article holder nas a plurality of compartments sewn to the fabric walls.

While each of the above bags and article holders function as desired, none of them serve as a static charge eliminating lingerie organizer.

It can be readily seen that there exists the continuing need for a static charge eliminating lingerie organizer comprising a plurality of individual lingerie storage pouches made of electrically conductive film for attracting static charge from the fabric of lingerie garments stored therein and a grounding pouch which serves to eliminate the static charge conducting along the conductive film of the plurality of individual lingerie storage pouches stored therein. Each of the plurality of individual lingerie storage pouches is separate and detached from the other, wherein each lingerie storage pouch is dimensioned to accommodate therein at least one lingerie garment for organizing garments into types of garments and/or lingerie sets. The grounding pouch is dimensioned to receive therein the plurality of individual lingerie storage pouches for binding the plurality of individual lingerie storage pouches together into a single unitary package.

SUMMARY OF THE INVENTION

The preferred embodiment of the static charge eliminating lingerie organizer of the present invention solves the aforementioned problems in a straight forward and simple manner. What is provided is a static charge eliminating lingerie organizer comprising a plurality of individual lingerie storage pouches made of electrically conductive film for attracting static charge from the fabric of lingerie garments stored therein and a grounding pouch which serves to eliminate the static charge conducting along the conductive film of the plurality of individual lingerie storage pouches stored therein. Each of the plurality of individual lingerie storage pouches is separate and detached from the other, wherein each lingerie storage pouch is dimensioned to accommodate therein at least one lingerie garment for organizing garments into types of garments and/or lingerie sets. The grounding pouch is dimensioned to receive therein the plurality of individual lingerie storage pouches for binding the plurality of individual lingerie storage pouches together into a single unitary package.

The static charge eliminating lingerie organizer comprises a plurality of individual lingerie storage pouches wherein each lingerie storage pouch is dimensioned to store therein at least one lingerie garment and wherein said each lingerie storage pouch attracts static charge of said at least one lingerie garment stored therein; and, a grounding pouch dimensioned to received said plurality of individual lingerie storage pouches and neutralize said static charge.

In view of the above, an object of the present invention is to provide a lingerie organizer having a plurality of individual lingerie storage pouches each of which is made of a flexible electrically conductive film, such as used in the semiconductor industry, to attract the state charge conducting along the fabric of a lingerie garment. Furthermore, it is preferred that such film is transparent to allow the contents of each individual lingerie storage pouch to be easily visually observed through the transparent film without any need to rummage through the convents stored therein.

Another object of the present invention is to provide a lingerie organizer having a grounding pouch which is grounded for neutralizing the static charge conducting along the surface of the plurality of lingerie storage pouches.

A further object of the present invention is to provide a grounding pouch which is made of a electrically conductive material which is grounded via a ground potential.

It is a still further object of the present invention to provide each individual lingerie storage pouch with a means for closing the lingerie storage pouch to prevent lingerie from falling out of such lingerie storage pouch.

It is a still further object of the present invention to provide a lingerie organizer with three individual lingerie storage pouches and a grounding pouch for receiving therein the three individual lingerie storage pouches. Therefore, the user can remove any one of the individual lingerie storage pouches from the grounding pouch to access the contents of the removed individual lingerie storage pouch.

It is a still further object of the present invention to provide a plurality of individual lingerie storage pouches uniquely constructed and contoured to allow each of the individual lingerie storage pouches to be parallelly stacked vertically or horizontally upon the other.

It is a still further object of the present invention to provide a grounding pouch which serves to maintain the plurality of individual lingerie storage pouches together and serves collapse the thickness of the plurality of individual lingerie storage pouches received within the grounding pouch, especially, if the individual lingerie storage pouches are filled with lingerie to capacity.

It is a still further object of the present invention to provide a plurality of individual lingerie storage pouches wherein each individual lingerie storage pouch is dimensioned to be conveniently placed within a drawer of a dresser or the like to organize the lingerie in such drawer. Additionally, the plurality of individual lingerie storage pouches is capable of being placed within a suitcase individually or as a single unitary package when bound together via the grounding pouch.

In view of the above objects, it is a feature of the present invention to provide a lingerie organizer which is simple and inexpensive to manufacture.

Another feature of the present invention is to provide a lingerie organizer which is relatively simple structurally.

A further feature of the present invention is to provide a lingerie organizer which is lightweight and compact.

The above and other objects and features of toe present invention will become apparent from the drawings, the description given herein, and the appended claims.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

DESCRIPTION OF THE EXEMPLARY EMBODIMENT

Figure 1:
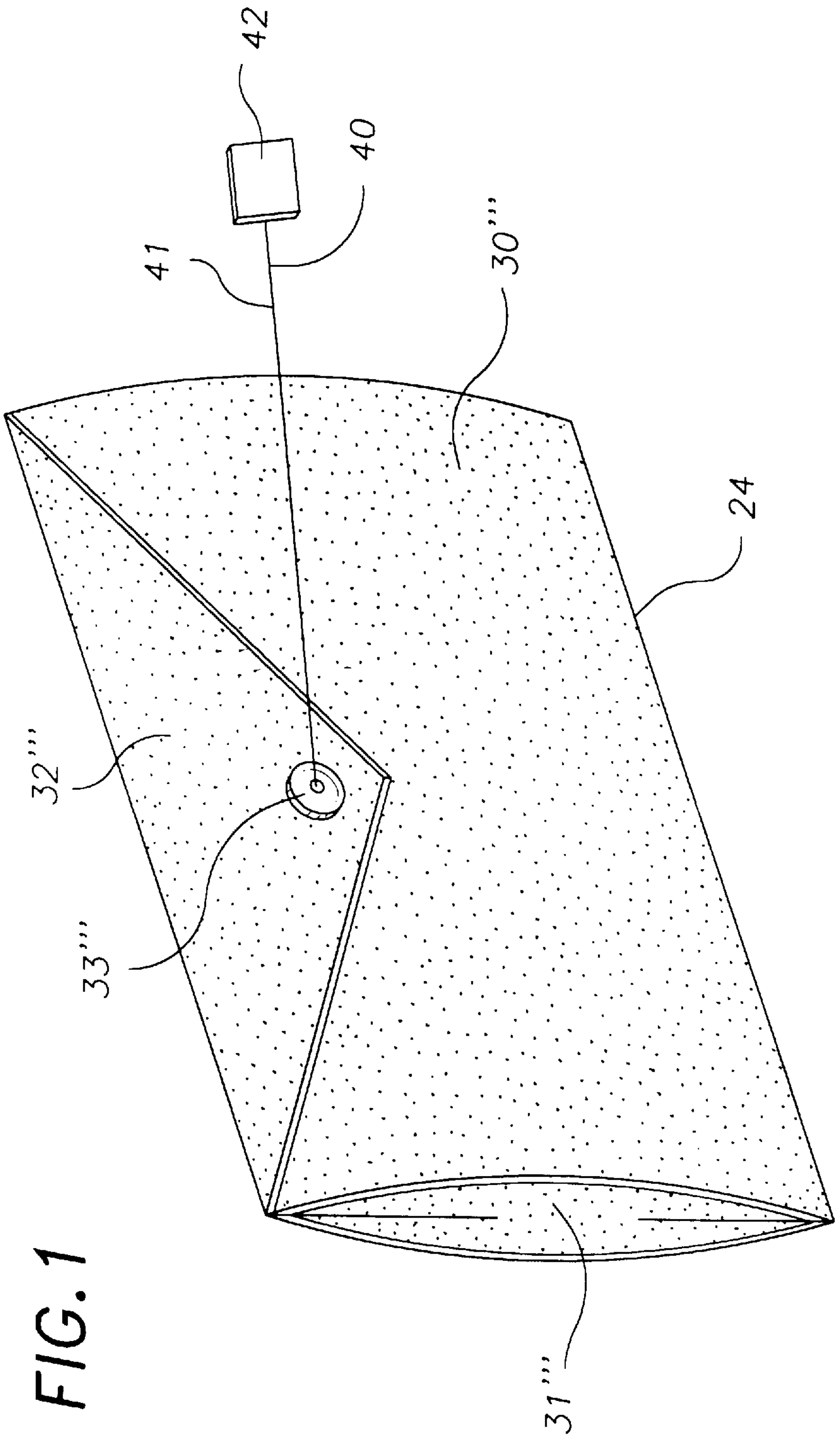
FIG. 1 illustrates a perspective view of the preferred embodiment of the grounding pouch of the lingerie organizer of the present invention.
Figure 1B:
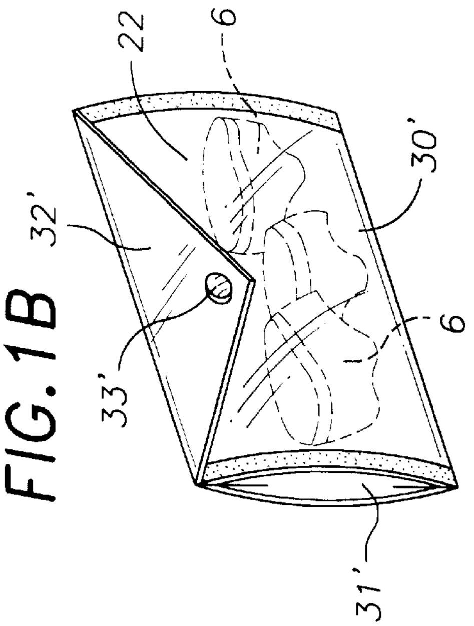
FIG. 1B illustrates a perspective view of a second one of the plurality of the plurality of individual lingerie storage pouches included in the lingerie organizer of the present invention.
Figure 1C:
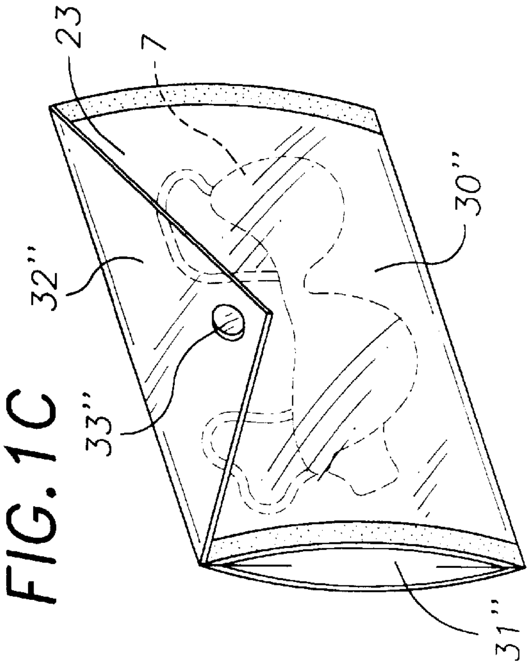
FIG. 1C illustrates a perspective view of a third one of the plurality of the plurality of individual lingerie storage pouches included in the lingerie organizer of the present invention.
Figure 1A:
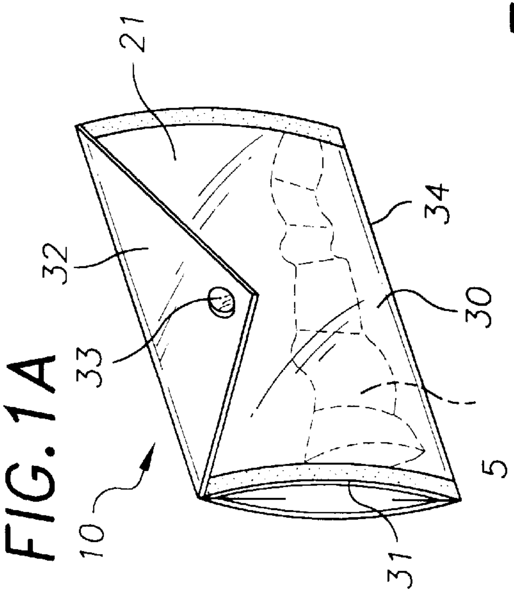
FIG. 1A illustrates a perspective view of a first one of the plurality of the plurality of individual lingerie storage included in the lingerie organizer of the present invention.

Referring now to the drawings, and in particular FIGS. 1, 1A, 1B, and 1C, Static charge eliminating lingerie organizer of the present invention is generally comprised of a plurality of individual lingerie storage pouches 21 (FIG. 1A), 22(FIG. 1B) and 23(FIG. 1AB), grounding pouch (FIG. 1) and electrical grounding means 40 (FIG. 1).

In the preferred embodiment, there are three individual lingerie storage pouches. Nevertheless, any number of individual lingerie storage pouches may be substituted. Individual lingerie storage pouches 21, 22 and 23 and grounding pouch 24 have an envelope type profile wherein the envelope profile has collapsible/expandable sides. Grounding pouch 24 is dimensioned to accommodate therein the plurality of individual lingerie storage pouches 21, 22, and 23.

In the exemplary embodiment, a first one of the three is a small lingerie storage pouch 21, the second one of the three is a medium lingerie storage pouch 22, and the third one of the three is a large lingerie storage pouch 23. The term small, medium and large are terms used to designate the size relationship of the three individual lingerie storage pouches. Small lingerie storage pouch 21 is essentially rectangularly shaped with a length of 7.5" and a width of 6.5". Medium lingerie storage pouch 22 is essentially square shaped with a length of 7.5" and a width of 7.5". Large lingerie storage pouch 23 is essentially rectangularly shaped with a length of 8.5" and a width of 7.5". Nevertheless, the length and width of small lingerie storage pouch 21, medium lingerie storage pouch 22 and large lingerie storage pouch 23 may vary, as desired, provided large lingerie storage pouch 23 can be placed within a drawer of a dresser without the need to fold large lingerie storage pouch 23. Furthermore, the plurality of individual lingerie storage pouches 21, 22, and 23 may all have the same dimensions.

As can be readily seen, small lingerie storage pouch 21, medium lingerie storage pouch 22, and large lingerie storage pouch 23 are separate and detached from the other and each is dimensioned to accommodate therein at least one lingerie garment for organizing garments into types of garments and/or lingerie sets. Since, the basic structure of the envelope profile of small lingerie storage pouch 21, medium lingerie storage pouch 22, large lingerie storage pouch 23 and grounding pouch 24 is essentially identical for each pouch except for size, only one such lingerie storage pouch will be described in detail.

Small lingerie storage pouch 21 comprises front panel 30, a back panel(not shown) parallel to front panel 30, first and second collapsible/expandable side panels 31 (only one side shown), flap member 32 and securing means 33. Front panel 30 and the back panel (not shown) are made of a unitary piece of material which folds in such a manner to provide two parallel overlapping panels. The fold of the unitary piece of material forms bottom edge 34 of small lingerie storage pouch 21. The left and right side edges of front panel 30 and the back panel have sewn thereto first and second collapsible/expandable side panels 31 (only one side shown), respectively, thereby forming a hollow enclosure. The opening of the hollow enclosure is defined by the top edge of front panel 30, the back panel and the first and second collapsible/expandable side panels 31 for placing at least one lingerie garment within the hollow enclosure via said opening. The top edge of the back panel has coupled thereto flap member 32 which is capable of flapping forward to overlap the exterior surface of front panel 30.

Flap member 32 may be unitary with the back panel or may be sewn to the top edge of the back panel. In the exemplary embodiment, flap member 32 is essentially triangularly shaped. Nevertheless, flap member 32 may be rectangularly shaped. Flap member 32 is secured to front panel 30 via securing means 33 to close the opening of the hollow enclosure. Thereby, lingerie garments are prevented from slipping out of the hollow enclosure. In the exemplary embodiment, securing means 33 is a snap. Nevertheless, any other securing means may be substituted.

The collapsible and expandable properties of first and second collapsible/expandable side panels 31 (only one side shown) serves to allow the thickness of small lingerie storage pouch 21 to expand as a lingerie garment is placed within the hollow enclosure of small lingerie storage pouch 21. More specifically, small lingerie storage pouch 21 can expand to accommodate the hand of the user placing the lingerie garment within the hollow enclosure. Moreover, the expandable properties allow several lingerie garments to be placed within small lingerie storage pouch 21. The collapsible properties of first and second collapsible/expandable side panels 31 allow the thickness of small lingerie storage pouch 21 to be reduced to the thickness of the contents stored within small lingerie storage pouch 21. The collapsible properties serves to facilitate two primary features of lingerie organizer 10. The first primary feature is to allow each of the plurality of individual lingerie storage pouches 21, 22 and 23 to be parallelly stacked vertically or horizontally upon the other. The collapsible properties allow the parallelly stacked plurality of individual lingerie storage pouches 21, 22 and 23 to be sandwiched together for a more compact profile. The second primary feature is that a larger number of lingerie set ensembles may be stored and organized in a limited amount of space.

Medium lingerie storage pouch 22 comprises front panel 30', a back panel(not shown) parallel to front panel 30', first and second collapsible/expandable side panels 31' (only one side shown), flap member 32' and securing means 33'. Large lingerie storage pouch 23 comprise front panel 30", a back panel(not shown) parallel to front panel 30", first and second collapsible/expandable side panels 31" (only one side shown), flap member 32" and securing means 33".

In the preferred embodiment, small lingerie storage pouch 21, medium lingerie storage pouch 22 and large lingerie storage pouch 23 are made of a flexible electrically conductive film, such as used in the semi-conductor industry to prevent static charge build up on semi-conductor chips, to attract the state charge conducting along the fabric of a lingerie garment. Furthermore, it is preferred that such film is transparent to allow the contents of each individual lingerie storage pouch to be easily visually observed through the transparent film without any need to rummage through the convents stored in the hollow enclosures of small lingerie storage pouch 21, medium lingerie storage pouch 22 and large lingerie storage pouch 23.

Grounding pouch 24 comprises front panel 30''', a back panel (not shown) parallel to front panel 30''', first and second collapsible/expandable side panels 31''' (only one side shown), flap member 32''' and securing means 33'''. Grounding pouch 24 differs from small lingerie storage pouch 21, medium lingerie storage pouch 22 and large lingerie storage pouch 23 in that grounding pouch 24 is made of a flexible material capable of conducting therethrough a ground potential. The static charges conducting along small lingerie storage pouch 21, medium lingerie storage pouch 22 and large lingerie storage pouch 23 are neutralized via the ground potential of grounding pouch 24. Henceforth, when the lingerie garments are removed from small lingerie storage pouch 21, medium lingerie storage pouch 22 and large lingerie storage pouch 23 such lingerie garments are static free. For example, the flexible material of grounding pouch 24 may have woven together electrically conductive strands of wire with other fabric strands which are essentially non-electrically conductive.

Grounding pouch 24 is dimensioned to removably receive therein the plurality of individual lingerie storage pouches 21, 22, and 23 for binding the plurality of individual lingerie storage pouches 21, 22, and 23 together into a single unitary package. Therefore, grounding pouch 24 serves to maintain the plurality of individual lingerie storage pouches 21, 22, and 23 together and serves collapse the thickness of the plurality of individual lingerie storage pouches 21, 22, and 23 received within grounding pouch 24, especially, it the individual lingerie storage pouches 21, 22, and 23 are filled with lingerie to capacity.

Electrical grounding means 40 comprises electrically conducting wire 41 having one end coupled to securing means 33'''. Nevertheless, the one end of electrically conducting wire 41 may be electrically coupled to any other portion of the electrically conductive fabric of grounding pouch 24. Securing means 33''' having one end coupled to conducting wire 41 would comprise at least a portion which would be electrically coupled to the electrically conductive fabric of ground pouch 24. The electrical contact of electrically conducting wire 41 to securing means 33''' or any other portion of grounding pouch 24 should be insulated.

The other end of electrically conducting wire 41 has coupled thereto ground connector 42 for electrically connecting electrical conducting wire 41 to a source of ground potential. For example, such source of ground potential may include, without limitation, the ground potential of a conventional wall outlet. In such an instance, the dresser needs to be adapted with an exit port for journalling therethrough the electrically conducting wire 41 to the ground potential of the conventional wall outlet. Additionally, it is desirable that the electrically conducting wire 41 be removable coupled from securing means 33''' so that when the user travels, grounding pouch 24 having received therein the plurality of individual lingerie storage pouches may be conveniently placed within a suitcase without the electrically conducting wire 41.

Static charge eliminating lingerie organizer 10 is dimensioned to be conveniently placed within a drawer of a dresser or the like to organize the lingerie in such drawer. Additionally, static charge eliminating lingerie organizer 10 is capable of being placed within a suitcase when the user travels. The binding properties of ground pouch 24, when the plurality of individual lingerie storage pouches 21, 22 and 23 are filled to capacity, serve to compress the lingerie garments into a compact package.

In operation, at least one pair of stockings 5 may be placed within small lingerie storage pouch 21 since the at least one pair of stockings 5 is susceptible to snags and rips. As can be appreciated, small lingerie storage pouch 21 serves to isolate the at least one pair of stockings 5 from tie nooks and clasps of bras 7 which can snag the at least one pair of stocking 5. At least one pair of underwear 6 may be placed in medium lingerie storage pouch 22 and at least one bra may be placed in large lingerie storage pouch 23. Nevertheless, a lingerie set comprising a bra and panties may be placed on medium lingerie storage pouch 22 or large lingerie storage pouch 23. Furthermore, a nightgown may be placed by its self in large lingerie storage pouch 23 or with the lingerie set. As can be appreciated, small lingerie storage pouch 22, medium lingerie storage pouch 23 and large lingerie storage pouch 24 may store therein any combination of lingerie garments desired.

After placing the lingerie garments in the plurality of individual lingerie storage pouches 21, 22 and 23, such pouches 21, 22, and 23 are placed within grounding pouch 24. Grounding pouch 24 when coupled to the ground potential serves it neutralize the static charge conducting along the electrically conductive film of the plurality of individual lingerie storage pouches 21, 22 and 23. Therefore, when the user opens any one of the individual lingerie storage pouches 21, 22 or 23, the lingerie garment is free of static charge.

Furthermore, grounding pouch 24 may receive therein lingerie garments. Therefore, the static charged fabric of the lingerie garments will be neutralized.

Figure 2C:
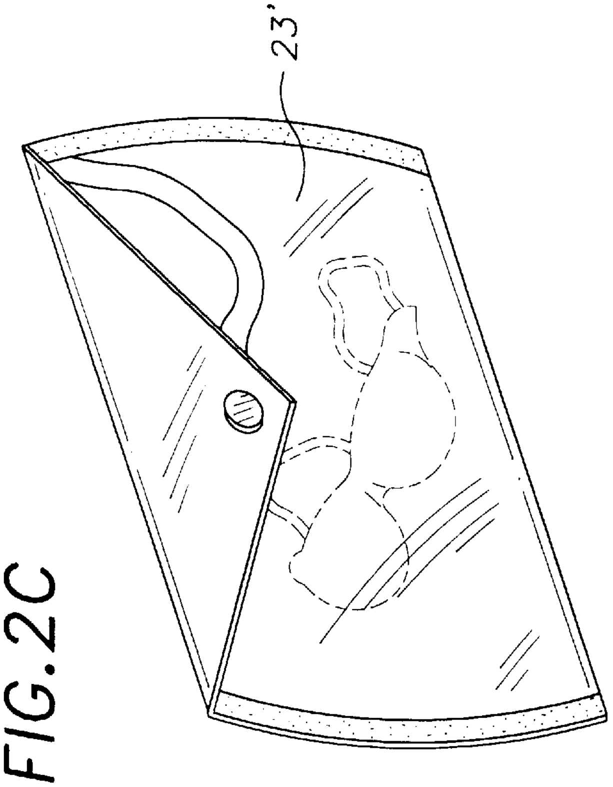
FIG. 2C illustrates a perspective view of a third alternate embodiment of the plurality of the plurality of individual storage pouches.
Figure 2A:
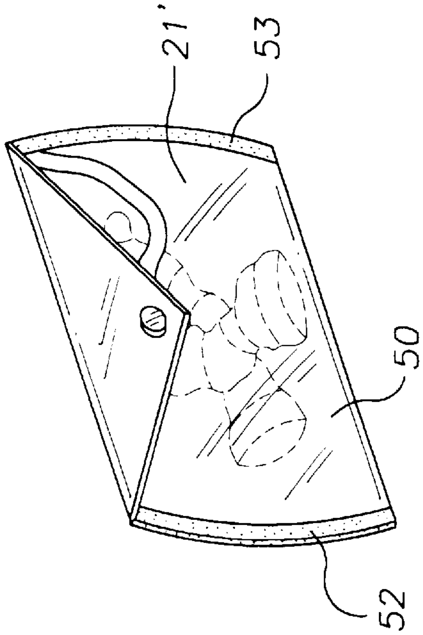
FIG. 2A illustrates a perspective view of a first alternate embodiment of the plurality of individual lingerie storage pouches.
Figure 2B:
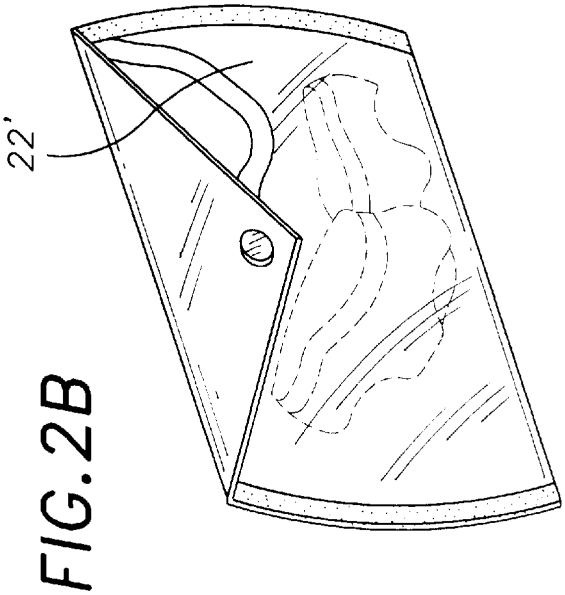
FIG. 2B illustrates a perspective view of a second alternate embodiment of the plurality of the plurality of individual lingerie storage pouches.

Referring now to FIGS. 2A, 2B and 2C an alternate embodiment of the plurality of individual lingerie storage pouches is shown. Since the basic structure of the envelope profile of the individual lingerie storage pouches 21', 22' and 23' are identical except for size, only one such individual lingerie storage pouch 2' will be described in detail. Individual lingerie storage pouch 21' has an envelope type profile wherein the envelope profile has non-collapsible/expandable sides 52 and 53. The side edges of front panel 50 and a back panel (not shown) parallel to front panel 50 are sewn or secured together.

It is noted that the embodiment of the static charge eliminating lingerie organizer described herein in detail, for exemplary purposes, is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A static charge eliminating lingerie organizer comprising:

a plurality of individual lingerie storage pouches wherein each lingerie storage pouch is dimensioned to store therein at least one lingerie garment and wherein said each lingerie storage pouch attracts static charge of said at least one lingerie garment stored therein; and, a grounding pouch dimensioned to received said plurality of individual lingerie storage pouches and neutralize said static charge.

2. The lingerie organizer of claim 1, wherein said each lingerie storage pouch is made of a electrically conductive film which attracts said static charge.

3. The lingerie organizer of claim 2, wherein said electrically conductive film is transparent to allow the contents of said each individual lingerie storage pouch to be easily visually observed through the transparent electrically conductive film.

4. The lingerie organizer of claim 1, wherein said each lingerie storage pouch and said grounding pouch has an envelope profile with expandable/collapsible sides.

5. The lingerie organizer of claim 1, wherein said grounding pouch is made of a flexible material capable of conducting therethrough a ground potential for neutralizing said static charge.

6. The lingerie organizer of claim 5, wherein said grounding pouch is electrically coupled to a source of ground potential for conducting said ground potential along said flexible material of said grounding pouch.

7. The lingerie organizer of claim 1, wherein said each individual lingerie storage pouch is constructed and contoured to allow said each individual lingerie storage pouch of said plurality of individual lingerie storage pouches to be parallelly stacked vertically or horizontally upon each other.

8. A static charge eliminating lingerie organizer comprising:

a plurality of individual lingerie storage pouches for separating and organizing a plurality of lingerie garments wherein each lingerie storage pouch is dimensioned to store wherein at least one lingerie garment of said plurality of lingerie garments and wherein said each lingerie storage pouch attracts static charge of said at least one lingerie garment stored therein; and, a grounding pouch dimensioned to received said plurality of individual lingerie storage pouches and neutralize said static charge.

9. The lingerie organizer of claim 8, wherein said each lingerie storage pouch is made of a electrically conductive film which attracts said static charge.

10. The lingerie organizer of claim 9, wherein said electrically conductive film is transparent to allow the contents of said each individual lingerie storage pouch to be easily visually observed through the transparent electrically conductive film.

11. The lingerie organizer of claim 8, wherein said each lingerie storage pouch and said grounding pouch has an envelope profile with expandable/collapsible sides.

12. The lingerie organizer of claim 8, wherein said grounding pouch is made of a flexible material capable of conducting therethrough a ground potential for neutralizing said static charge.

13. The lingerie organizer of claim 12, wherein said grounding pouch is electrically coupled to a source of ground potential for conducting said ground potential along said flexible material of said grounding pouch.

14. The lingerie organizer of claim 8, wherein said each individual lingerie storage pouch is constructed and contoured to allow said each individual lingerie storage pouch of said plurality of individual lingerie storage pouches to be parallelly stacked vertically or horizontally upon each other.

15. A static charge eliminating lingerie organizer comprising:

a plurality of individual lingerie storage pouches for separating and organizing a plurality of lingerie garments wherein each lingerie storage pouch is dimensioned to store therein at least one lingerie garment of said plurality of lingerie garments and wherein said each lingerie storage pouch is made of an electrically conductive film which attracts static charge of said at least one lingerie garment stored therein; and, a grounding pouch dimensioned to received said plurality of individual lingerie storage pouches and neutralize said static charge wherein said grounding pouch is made of a material capable of conducting therethrough a ground potential for neutralizing said static charge.

16. The lingerie organizer of claim 15, wherein said electrically conductive film is transparent to allow the contents of said each individual lingerie storage pouch to be easily visually observed through the transparent electrically conductive film.

17. The lingerie organizer of claim 15, wherein said each lingerie storage pouch and said grounding pouch has an envelope profile with expandable/collapsible sides.

18. The lingerie organizer of claim 15, wherein said grounding pouch is electrically coupled to a source of ground potential for conducting said ground potential along said material of said grounding pouch.

19. The lingerie organizer of claim 15, wherein said each individual lingerie storage pouch is constructed and contoured to allow said each individual lingerie storage pouch of said plurality of individual lingerie storage pouches to be parallelly stacked vertically or horizontally upon each other.

* * * * *